Patented Oct. 10, 1922.

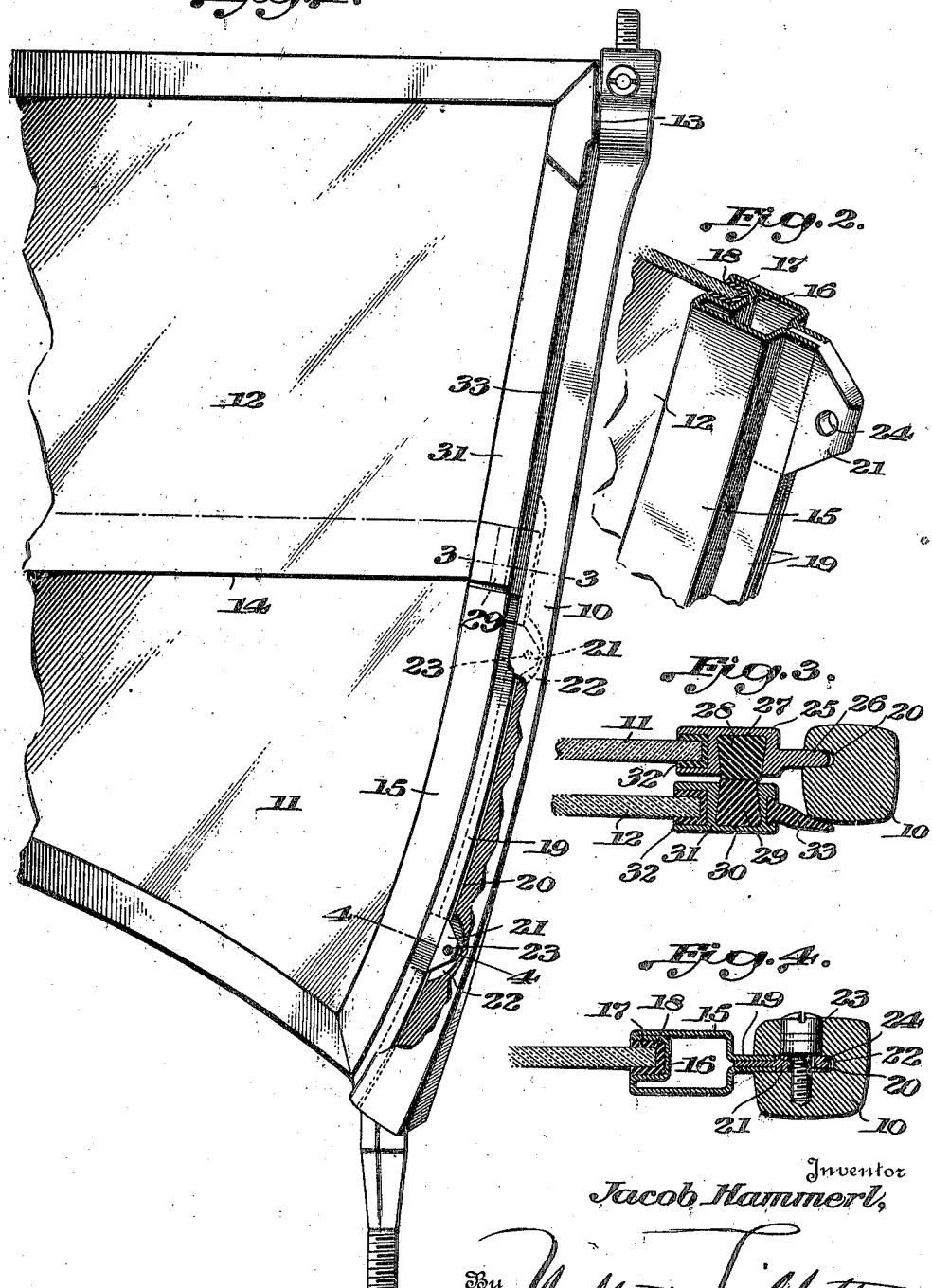

1,431,458

UNITED STATES PATENT OFFICE.

JACOB HAMMERL, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 1, 1920. Serial No. 421,013.

*To all whom it may concern:*

Be it known that I, JACOB HAMMERL, a citizen of the United States, and a resident of Detroit, Wayne County, State of Michigan, have invented certain new and useful Improvements in Motor Vehicles, of which the following is a specification.

This invention relates to motor vehicles and more particularly to windshields therefor.

One of the objects of the invention is to simplify the windshield construction, and particularly, the manner of mounting or supporting windshields.

Another object of the invention is to provide a mounting for a windshield that will be rigid in construction and will not tend to loosen or rattle.

Further objects of the invention will appear from the following specification, taken in connection with the drawings which form a part of this application, and in which:

Fig. 1 is a vertical elevation of a portion of a windshield and the windshield mounting constructed in accordance with my invention;

Fig. 2 is a detail perspective view, on an enlarged scale, illustrating the means for connecting the windshield rail or frame member to the stanchion;

Fig. 3 is a detail sectional view, on an enlarged scale and taken substantially on line 3—3 of Fig. 1; and Fig. 4 is a sectional view taken substantially on line 4—4 of Fig. 1, and illustrating, on an enlarged scale, the method of securing the windshield side frame member to the stanchion.

Referring to the drawings, I have shown, in Fig. 1, in front elevation, one side portion of a windshield and the supporting stanchion, and inasmuch as the other side of the windshield is supported in exactly the same manner, it has not been deemed necessary to illustrate the entire windshield.

In the windshield construction illustrated, a vertical stanchion 10 is secured in any suitable manner to the body of the motor vehicle, it being understood that one of these stanchions is secured at each side of the vehicle, for supporting the two ends of the windshield. The lower sash 11 of the windshield is, in this instance, rigidly mounted on the stanchions in a manner hereinafter described, and the upper sash 12 is pivoted at 13 to the upper ends of the stanchions, and overlaps the lower sash as indicated at 14.

The means for supporting or mounting sash 11 on the stanchion 10 comprises a side rail or frame member 15, preferably formed of a single piece of sheet metal, the inner edge of the member 15 being indented or recessed, as shown at 16, to receive the side edge 17 of the sash 11, a rubber cushion 18 being interposed between the edge of the sash and the recessed portion 16 of the frame member. The frame member 15 is substantially rectangular in shape, and the free ends are extended laterally and in substantially parallel relation, as shown at 19, these edges extending into a longitudinal groove 20, formed in the inner edge of the stanchion 10, thus closing the opening between the main portion of the frame 15 and the inner edge of the stanchion.

In order to rigidly secure the side rail or frame member 15 to the stanchion, a plurality of lugs or ears 21 are secured in some suitable manner, such as by brazing or welding, to the laterally extending portions 19 of the frame members 15. In order to accommodate these lugs, the stanchion 10 is provided with recesses 22, extending laterally from the groove 20 and the lugs 21 extend into these recesses, and are secured therein by means of screws 23 which pass through suitable apertures 24 formed in the lugs and securely clamp the lugs in rigid position in the recesses of the stanchion. In the showing in Fig. 1, two of the lugs 21 have been illustrated, but it will be understood that as many may be provided as seems desirable.

The upper end of the lower sash 11 has secured thereto, a side frame member 25, having a laterally extending portion 26 extending into the groove 20 of the stanchion 10, and the member 25 is also provided with a recess 27 in which is positioned a rubber bumper 28, which is adapted to engage a corresponding bumper 29 disposed in a recess 30, formed in a frame member 31 secured to the side edge of the upper sash 12. The inner edges of the members 25 and 31 are recessed and provided with rubber cushions 32 for receiving the lateral edges of the windshield sashes. The member 31, secured to the edge of the upper sash 12, is provided at its outer edge with a flexible rubber strip 33 which closes the gap between the member 31, or edge of the sash and the stanchion 10.

From the above description, it will be seen that I have provided a simple, rigid and efficient means for securing the stationary windshield sash to the stanchions, and, moreover, it will be evident that the means provided will not be liable to loosen and rattle under the strains and stresses to which it is subjected.

While I have, in the above specification, described one specific embodiment of my invention, it will be understood that I do not intend to be limited to the exact structure illustrated and described, but that the invention is capable of modification, and that changes in the construction and in the arrangement of the cooperating parts may be made without departing from the spirit or scope of the invention as expressed in the following claims.

Having described my invention, what I claim and desire to secure by Letters Patent is:

1. In a motor vehicle, a stanchion having recesses formed therein, a sheet metal frame member having a recessed portion along one edge adapted to receive a sash and having a laterally extending web along its opposite edge, lugs secured to said web and means for rigidly securing said lugs in the recesses of said stanchion.

2. In a motor vehicle, a stanchion having a longitudinally extending groove and laterally extending recesses opening into said groove, a sheet metal frame member having a recess portion along one edge adapted to receive a sash, and having laterally extending, substantially parallel web portions along its opposite edge, adapted to enter the groove in said stanchion, and lugs secured to said web portions and adapted to enter the recesses in said stanchion, and means for securing said lugs in said recesses.

In testimony whereof I affix my signature.

JACOB HAMMERL.